(12) United States Patent
Maillet, Jr. et al.

(10) Patent No.: US 9,598,560 B2
(45) Date of Patent: Mar. 21, 2017

(54) PROCESS FOR PREPARING A SILICA-COVERED CARBON-BASED SPECIES

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Emilie Maillet, Jr., Clermont-Ferrand, FL (US); Guillaume Guzman, Clermont-Ferrand (FR); Julien Berriot, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(*) Notice: Subject to any disclaimer, the term of this patent is extended or adjusted under 35 U.S.C. 154(b) by 0 days.

(21) Appl. No.: 14/408,746

(22) PCT Filed: Jun. 20, 2013

(86) PCT No.: PCT/EP2013/062932
§ 371 (c)(1),
(2) Date: Dec. 17, 2014

(87) PCT Pub. No.: WO2013/190063
PCT Pub. Date: Dec. 27, 2013

(65) Prior Publication Data
US 2015/0191584 A1    Jul. 9, 2015

(30) Foreign Application Priority Data
Jun. 21, 2012  (FR) ..................... 12 55868

(51) Int. Cl.
C08K 9/02 (2006.01)
B05D 3/10 (2006.01)
(Continued)

(52) U.S. Cl.
CPC ............. C08K 9/02 (2013.01); B05D 3/10 (2013.01); C09C 1/44 (2013.01); C09C 1/46 (2013.01); C09C 1/56 (2013.01); *C01P 2006/12* (2013.01)

(58) Field of Classification Search
None
See application file for complete search history.

(56) References Cited

U.S. PATENT DOCUMENTS 5,883,179 A * 3/1999 Kawazoe ............... C08K 9/02
                                                    524/492
6,197,274 B1    3/2001 Mahmud et al.
(Continued)

FOREIGN PATENT DOCUMENTS

| EP | 0799854 A1 | 10/1997 |
|----|----|----|
| WO | 9813428 A1 | 4/1998 |
| WO | 005312 A1 | 2/2000 |

OTHER PUBLICATIONS

International Search Report for PCT/EP2013/062932 dated Sep. 23, 2013.

*Primary Examiner* — Jeffrey Washville
(74) *Attorney, Agent, or Firm* — Dickinson Wright PLLC

(57) ABSTRACT

A process for preparing a carbon species partially or completely covered with silica, including:
  bringing the carbon species into contact, in an aqueous medium, with one or more cationic surfactants,
  adjusting the pH of the reaction medium of the suspension using an alkaline agent to a pH that varies from 8 to 10,
(Continued)

adding one or more alkali metal silicates to the reaction medium obtained, while maintaining the pH of the reaction medium between 8 and 10.

9 Claims, 3 Drawing Sheets

(51) Int. Cl.
*C09C 1/44* (2006.01)
*C09C 1/46* (2006.01)
*C09C 1/56* (2006.01)

(56) References Cited

U.S. PATENT DOCUMENTS

| | | |
|---|---|---|
| 6,541,113 B1 | 4/2003 | Mehos et al. |
| 2006/0073510 A1* | 4/2006 | Fox .................. G01N 33/54393 435/6.16 |
| 2006/0131440 A1* | 6/2006 | Yen ....................... B01F 3/1214 239/102.2 |

* cited by examiner

PROCESS FOR PREPARING A SILICA-COVERED CARBON-BASED SPECIES

This application is a 371 national phase entry of PCT/EP20130/62932, filed 20 Jun. 2013, which claims benefit of French Patent Application No. 1255868, filed 21 Jun. 2012, the entire contents of which are incorporated herein by reference for all purposes.

BACKGROUND

1. Field

The present disclosure relates to a process for preparing a carbon species that is partially or completely covered with silica.

2. Description of Related Art

Carbon species, in particular carbon black, and silica are well known reinforcing fillers that are generally used for reinforcing tire compositions based on diene elastomers.

In the field of the manufacture of tires and in particular of the formulation of rubber compositions that are in contact with the ground, known as treads, it is generally sought to find the best possible compromise between conflicting performances such as the behaviour of the vehicle, rolling resistance, dry and wet grip, and wear.

Carbon black is known for its great reinforcing ability in rubber compounds, while silica itself makes it possible to obtain improved hysteresis properties, i.e. a reduced hysteresis of the rubber compositions. There is therefore a need for a filler that provides the hysteresis level of silica and the reinforcing character of a carbon black in rubber compositions.

This is why certain documents, such as the publications WO 9813428 and EP 711 805 B1, disclose a process for synthesizing novel reinforcing fillers consisting of carbon black covered at least partially with silica.

SUMMARY

It is sought to provide another more economical process which makes it possible to better control the deposition of silica on the carbon black. In particular, it is desired to provide a process that makes it possible to control the amount of silica deposited, and which makes it possible to partially or completely cover the carbon species.

The applicant companies have discovered that these objectives could be achieved by using a cationic surfactant which is deposited on the surface of the carbon species, the silica being deposited on said surfactant.

The subject of an embodiment of the invention is therefore a process for preparing carbon black partially or completely covered with silica, comprising the following steps:
  the carbon species is brought into contact, in an aqueous medium, with one or more cationic surfactants,
  the pH of the reaction medium of the suspension is adjusted using an alkaline agent to a pH that varies from 8 to 10,
  one or more alkali metal silicates are added to the reaction medium obtained, while maintaining the pH of the reaction medium between 8 and 10.

DETAILED DESCRIPTION OF SPECIFIC EMBODIMENTS

Figure 1:
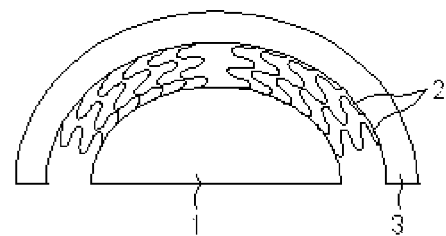
FIG. 1 schematically represents a carbon species completely covered with silica.

The expression "carbon species" is understood within the meaning of the disclosure to be a particulate object that contains only carbon atoms in its mass, not taking into account impurities, it being understood that there may be other atoms at the surface.

The carbon species may be selected, without this list being exhaustive, from carbon blacks, natural and synthetic graphites, carbon fibres, graphenes, fullerenes, acetylene blacks and carbon nanotubes.

All carbon blacks conventionally used in tires (tire-grade blacks) are suitable as carbon blacks. Among these tire-grade blacks, mention will more particularly be made of the reinforcing carbon blacks of the 100, 200 or 300 series (ASTM grades), such as for example the N115, N134, N234, N326, N330, N339, N347 or N375 blacks, or else, depending on the applications targeted, the blacks of higher 500, 600 or 700 series, for example the N550, N660, N683 or N772 blacks (ASTM grades).

The cationic surfactant(s) is (are) generally selected from cetyltrimethylammonium bromide, hexadecylamine, sodium 1-pentane-sulphonate monohydrate, ethonium, decamethoxine, tetradecyl-trimethylammonium bromide, decyltrimethylammonium bromide, dodecyltrimethylammonium bromide, cetyltrimethylammonium chloride, tetramethylammonium hydroxide, dodecylpyridinium bromide, and cetylpyridinium chloride.

Preferably, the cationic surfactant is cetyltrimethylammonium bromide.

The presence of cationic surfactants at the surface of the carbon species enables an efficient precipitation of the silica on this surface.

In the absence of cationic surfactant, the yield (effective silica content/targeted silica content) is less than 10%. In the presence of cationic surfactant, the silica precipitates and is deposited on the carbon species. The yield is greater than 80% for amounts of cationic surfactant greater than or equal to 0.1 molecule of cationic surfactant/nm$^2$.

However, the amount of cationic surfactant must not be too large. Indeed, if the cationic surfactant introduced is not completely adsorbed at the surface of the carbon species, it forms micelles in the medium, and the silica will precipitate around these micelles and form co-precipitated silica.

The amount of cationic surfactant added is advantageously such that the cationic charge density of the BET specific surface area of the carbon species varies from 0.05 to 2 cationic charges per nm$^2$ of the carbon species.

Thus, the cationic surfactant(s) is (are) present preferably in an amount that varies from 0.1 to 1.5, preferably 0.5 to 1.5 molecules of surfactant per nm$^2$ of BET specific surface area of the carbon species.

The carbon species and the cationic surfactant(s) are advantageously brought into contact while heating, at a temperature between 70° C. and 90° C.

After the carbon species has been contacted, the pH is adjusted using an alkaline agent to a pH that varies from 8 to 10, preferably from 8.5 to 9.5. The pH is generally adjusted using an alkali metal hydroxide, for example sodium hydroxide.

As explained above, the third step of the process according to the invention consists in reacting the suspension of the carbon species with an alkali metal silicate, in order to deposit silica on the surface of the carbon species.

The reaction is generally carried out while heating at a temperature between 70° C. and 90° C.

The alkali metal silicate may be sodium silicate or a potassium silicate, preferably sodium silicate.

Preferably, during the reaction with the alkali metal silicate, the pH is maintained at a value that varies from 8 to 10, preferably from 8.5 to 9.5. The pH is maintained by means of the addition of an acidifying agent, such as for example sulphuric acid, hydrochloric acid, acetic acid, lactic acid, boric acid, citric acid and phosphoric acid.

Maintaining the pH enables the precipitation of the negatively charged silica and its growth on the surface of the carbon species activated by the cationic surfactant, and therefore positively charged.

For simplification purposes, irrespective of the targeted silica content, it is possible to define a theoretical thickness, in which hypothesis the silica entirely covers the carbon species with a uniform layer. Below a certain theoretical thickness the silica does not completely cover the carbon species. In this case, it is considered that the carbon species is partially covered. This value has not been determined experimentally and depends on the carbon species used.

The silica content depends on the specific surface area in agreement with the following formula:

$$\frac{T}{1-T} = e_{theo} \times SS \times \rho_{SiO_2} \Leftrightarrow e_{theo} = \frac{T}{(1-T) \times SS \times \rho_{SiO_2}}$$

where T=silica content, defined by the formula $$T = m_{SiO2}/(m_{SiO2} + m_c)$$

where $m_{SiO2}$ is the mass of silica and $m_c$ is the mass of carbon $e_{theo}$=theoretical thickness in nm SS=specific surface area in $nm^2/g$ (X $m^2/g \times 10^{18}$) determined by the BET method $\rho_{SiO_2}$ density of the silica=$2.1 \times 10^{21}$ $g/nm^3$ By way of illustration, for a carbon species having a BET specific surface area of 140 $m^2/g$, the amount of silica deposited on the carbon species generally varies from 3% to 60%, preferably from 5% to 50% by weight relative to the total weight (silica+carbon). Below 3% the properties correspond to the properties of the carbon black, above 60% the properties correspond to those of the silica precipitated alongside the carbon black.

The amount of alkali metal silicate added generally depends on the theoretical thickness $e_{theo}$ of silica deposited on the carbon species.

The thickness of silica deposited on the carbon species preferably varies from 0.1 to 5 nm, more preferably from 0.2 to 3 nm.

As a general rule, the ratio between the silica content by mass (defined as the amount of silica over the total amount of carbon black and silica) deposited on the carbon species and BET specific surface area of the carbon black varies from 0.02 to 0.36, preferably from 0.03 to 0.21, the silica content by mass deposited on the carbon species being expressed as a percentage and the BET being expressed in $m^2/g$.

Represented schematically in FIG. 1 is an example of a carbon species completely covered with silica, obtained according to an embodiment of the invention. Adsorbed on the carbon species 1 is the cationic surfactant 2 which forms a thin layer. The silica 3 is deposited on the layer of cationic surfactant 2. The high content of cationic surfactant enables the latter to completely cover the carbon species. The high content of silica enables the latter to completely cover the cationic surfactant, and therefore completely cover the carbon species. The cationic surfactant is not visible at the surface of the filler obtained.

Figure 2:
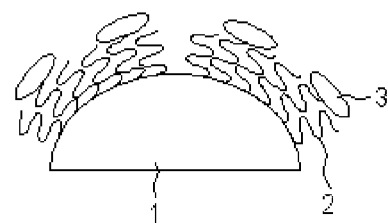
FIG. 2 schematically represents a carbon species partially covered with silica.

Represented schematically in FIG. 2 is a carbon species partially covered with silica, obtained according to an embodiment of the invention. Adsorbed on the carbon species 1 is the cationic surfactant 2 which forms a thin layer. The silica 3 is partially deposited on the layer of cationic surfactant 2. The high content of cationic surfactant enables the latter to completely cover the carbon species. The low content of silica enables the latter to only partially cover the cationic surfactant and therefore only partially cover the carbon species. The cationic surfactant is visible at the surface of the filler obtained.

Figure 3:
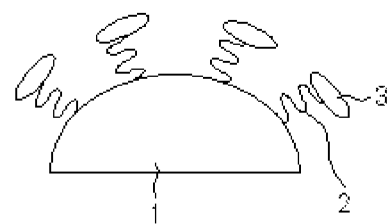
FIG. 3 schematically represents another carbon species partially covered with silica.

Represented schematically in FIG. 3 is a carbon species partially covered with silica, obtained according to an embodiment of the invention. Adsorbed partially on the carbon species 1 is the cationic surfactant 2. The silica 3 is partially deposited on the cationic surfactant 2. The low content of cationic surfactant enables the latter to only partially cover the carbon species. The low content of silica enables the latter to exactly cover the cationic surfactant. The cationic surfactant is not visible at the surface of the filler obtained. The silica partially covers the surface of the carbon species.

The invention is illustrated by the following examples.

EXAMPLES

Measurements and Tests Used

BET Specific Surface Area:

The BET specific surface area (denoted by SS) is determined in a known manner, according to the Brunauer-Emmet-Teller method described in "The Journal of the American Chemical Society" Vol. 60, page 309, February 1938 and corresponding to the standard AFNOR-NF-T 45 007 (November 1987).

Dynamic Properties

The dynamic properties $\Delta G^*$ and $\tan(\delta)_{max}$ are measured on a viscosity analyser (Metravib VA4000), according to the standard ASTM D 5992-96. The response of a sample of vulcanized composition (cylindrical test specimen with a thickness of 4 mm and a cross section of 400 $mm^2$), subjected to a simple alternating sinusoidal shear stress, at a frequency of 10 Hz, is recorded under standard temperature conditions (23° C.) according to the standard ASTM D 1349-99, or, depending on the case, at a different temperature. A strain amplitude sweep is carried out from 0.1% to 100% (forward cycle), then from 100% to 0.1% (return cycle). The result made use of is the loss factor $\tan(\delta)$. For the return cycle, the maximum value of $\tan(\delta)$ observed, denoted by $\tan(\delta)_{max}$, is indicated.

Tensile Tests

These tensile tests make it possible to determine the elasticity stresses and the properties at break. Unless otherwise indicated, they are carried out in accordance with the French standard NF T 46-002 of September 1988. At second elongation (i.e., after an accommodation cycle at the extension rate provided for the measurement itself), the nominal secant modulus (or apparent stress, in MPa) is measured at 100% elongation (denoted by MA100) and at 300% elongation (denoted by MA300).

Measurement of the Experimental Silica Content

The silica content is measured according to the following protocol:
- introduce, into a previously tared platinum dish ($m_1$), 500 mg of carbon black ($m_2$),
- precalcine using a Meker burner,
- calcine in a muffle furnace for 2 h at 800° C.,
- leave to cool in a desiccator,
- weigh the dish again ($m_3$),
- add 10 ml of hydrofluoric acid and bring to dryness using a sand bath,
- weigh the dish again ($m_4$).

The silica content by mass is then deduced therefrom using the following calculation:

$$\% \ SiO_2 = \frac{(m_3 - m_4)}{m_2} \times 100$$

Measurement of the Site Energy Distribution (SED)

The site energy distribution (also known as the adsorption energy distribution of gas onto a solid), gives information about the heterogeneity of the solid surfaces. It is determined from measurements of the adsorption isotherms of nitrogen or of other gases by considering that the overall isotherm corresponds to the superposition of local isotherms, each local isotherm corresponding to a given site type, characterized by a characteristic adsorption energy value $\epsilon_{site}$ (see, as reference, the works by A. Schroder et al. in Carbon 40 (2002) 207-210).

The adsorption energy is related to the pressure by the following equation:

$$\varepsilon = -RT \cdot \ln(P/P_0)$$

where P is the partial pressure of the gas and $P_0$ is the saturation vapour pressure of the gas at the measurement temperature. The $P/P_0$ ratio is known as the relative pressure. R is the ideal gas constant and T is the temperature.

The overall adsorption isotherm $Q(\epsilon)$ on the heterogeneous surface may be written as a sum of local isotherms, each local isotherm corresponding to a given site type, characterized by a characteristic value $E_{site}$ of the adsorption energy. This sum is written thus:

$$\frac{Q(\varepsilon)}{Q_{mono}} = \int_0^{+\infty} \chi(\varepsilon_{site}) \cdot \theta(\varepsilon_{site}, \varepsilon) \cdot d\varepsilon_{site}$$

where $Q(\epsilon)$ is the adsorption isotherm, $\theta(\epsilon_{site}, \epsilon)$ is the local isotherm and $\chi(\epsilon_{site})$ is the energy site distribution.

In the case of condensation:

$\theta(\epsilon_{site}, \epsilon) = 1$ if $\epsilon < \epsilon_{site}$ $\theta(\epsilon_{site}, \epsilon) = 0$ if $\epsilon > \epsilon_{site}$ and by using the experimental variable as being the partial pressure, it is possible to write the equation that makes it possible to calculate the energy site distribution:

$$\chi(\varepsilon_{site}) = -\frac{P}{RT} \cdot \frac{\partial}{\partial P}\left(\frac{Q(P)}{Q_{mono}}\right)$$

The adsorption isotherms $P/P_0$ were determined using a Micromeritics ASAP 2010 device.

In order for the measurement to be representative, the sample must be equivalent to a surface area of 15 to 50 m², namely for example for a carbon black of 120 m²/g, a test sample of between 125 mg and 417 mg.

The sample is conditioned for one hour at 200° C. on the degassing station. Thus, a maximum amount of water and possible traces of parasitic gases trapped at the surface of the sample are removed, owing to a very powerful vacuum pump.

Next, since the SED measurement then requires a weighing at this moment in order to know the exact mass of products, a step of returning to atmospheric pressure is carried out by adding helium.

After the weighing, a degassing is carried out for 30 minutes at the measurement station at 200° C. in order to eliminate the helium introduced before the weighing.

The measurement is carried out at –273° C., the sample being submerged in a bath of liquid nitrogen during the measurement.

Example 1

A silica-covered carbon black is prepared according to the process according to the invention.

Introduced into a 250 mL beaker (70 mm diameter) are, in this order:
- 0.848 g of cetyltrimethylammonium bromide (CTAB),
- 10 g of N134 carbon black,
- 150 mL of water, while stirring with a spatula in order to distribute the CTAB.

Sonication is carried out for 8 minutes using a 19 mm ultrasonic probe with the reference 630-0208 and with an amplitude of 61 µm when used at 100% of its amplitude, in combination with a booster (BHN15GC) which multiplies the amplitude by 1.5 (i.e. 91.5 µm for use at 100% of its amplitude). The generator used is Sonics VibraCell VCF1500, of 1500 W, 20 kHz, used here at 60% of the maximum amplitude. The sonication is carried out in an ice bath in order to prevent the suspension heating up.

The suspension is introduced into a 500 mL three-necked flask, and 100 mL of water are added (by rinsing the beaker). The round-bottomed flask is equipped with a condenser and the medium is heated at 80° C., with stirring.

A sufficient amount of 1M sodium hydroxide is then added in order to raise the pH to 9.

A solution of sodium silicate containing 25.6 g of $SiO_2$/L is prepared. For this, 4.27 g of sodium silicate (7.85% $Na_2O$:26.7% $SiO_2$ by mass) are diluted in 40.19 mL of water. This solution makes it possible to target a theoretical content of silica deposited of 10% by weight relative to the (silica+carbon) weight, and a theoretical thickness of 0.38 nm.

The silica content is calculated as explained above by virtue of the formula:

$$T = m_{SiO2}/(m_{SiO2} + m_c)$$

where $m_{SiO2}$ is the mass of silica and $m_c$ is the mass of carbon.

The theoretical thickness of silica deposited is calculated in the following manner:

$$\frac{T}{1-T} = e_{theo} \times SS \times \rho_{SiO_2} \Leftrightarrow e_{theo} = \frac{T}{(1-T) \times SS \times \rho_{SiO_2}}$$

where T=silica content,
$e_{theo}$=theoretical thickness in nm
SS=specific surface area in $nm^2/g$ (X $m^2/g \times 10^{18}$)
$\rho_{SiO_2}$=density of the silica=$2.1 \times 10^{21}$ $g/nm^3$ The amount of surfactant is expressed as the number of cationic functions per $nm^2$ of carbon black (denoted by function+/$nm^2$), it therefore depends on the mass and on the specific surface area of the substrate:

Surface area to be covered S=mass of carbon black×BET (SS) of the carbon black, in $nm^2$.

Number of CTAB molecules=S×function+/$nm^2$ since only one cationic function in this case.

Number of moles of CTAB=S×function+/$nm^2$/$6.02 \times 10^{23}$
Mass of CTAB=S×function+/$nm^2$×$MM_{ctab}$/$6.02 \times 10^{23}$
$MM_{ctab}$ being the molar mass of CTAB: 364.46 g/mol By means of two peristaltic pumps, the following are added simultaneously: the precursor solution at 2 mL/min and 0.82M sulphuric acid at 15 mL/min, so that the pH, by manual control, is constant at 9.

Once the addition is complete, the medium is left to react for 30 minutes at 80° C., with stirring.

The reaction medium is then split into 2 buckets of equal mass. The filler is recovered by centrifugation (Sigma 4K15 bucket centrifuge, 8000 rpm, 10 min, 20° C.).

Next, 4 washing operations were carried out. For each washing operation the supernatant is eliminated, the filler cakes are recovered and re-dispersed in 200 mL of water, i.e. 100 mL per bucket, and re-centrifuged. In the last washing operation, the supernatant reaches a pH of 7.

An $SiO_2$ content of 8.23% by weight is obtained.

If it is considered that the silica is deposited as a uniform layer over the entire surface of the black, a theoretical thickness $ESiO_2$=0.30 nm is obtained for a targeted thickness of 0.38 nm.

Therefore, a theoretical silica thickness is obtained that is close to the targeted theoretical thickness.

Example 2

Three syntheses are carried out according to the protocol already described in Example 1, by varying the silica content, according to the experimental design indicated in Table 1. The carbon black used is N134.

TABLE 1

| | Targeted thickness (nm) | Targeted silica content (wt %) | Mass of silicate (g/10 g of N134) | Volume of water for the silicate solution (mL) |
|---|---|---|---|---|
| 1 | 0.5 | 12.8 | 5.65 | 53.17 |
| 2 | 1.5 | 30.6 | 16.96 | 159.51 |
| 3 | 3 | 46.9 | 33.92 | 319.0 |

Protocol

Introduced into a 250 mL beaker are, in this order:
0.8476 g of cetyltrimethylammonium bromide (CTAB),
10 g of N347,
150 mL of water, while stirring with a spatula in order to distribute the CTAB.

Homogenisation is carried out for 10 minutes using an Ultra-Turrax rotor-stator (speed 3-4).

Sonication is carried out for 8 minutes using a 19 mm ultrasonic probe with the reference 630-0208 and with an amplitude of 61 µm when used at 100% of its amplitude, in combination with a booster (BHN15GC) which multiplies the amplitude by 1.5 (i.e. 91.5 µm for use at 100% of its amplitude). The generator used is Sonics VibraCell VCF1500, of 1500 W, 20 kHz, used here at 60% of the maximum amplitude. The sonication is carried out in an ice bath in order to prevent the suspension heating up.

The whole of the suspension is introduced into a 1 L three-necked flask. The medium is heated at 70° C. using a thermostatic bath, with stirring.

A sufficient amount of 1M sodium hydroxide is added in order to raise the pH to 9, when the medium is temperature-stable.

A solution of sodium silicate is prepared. For this, sodium silicate $Na_2SiO_3$ is diluted in water according to the proportions indicated in Table 1.

It is introduced into the round-bottomed flask, by means of a peristaltic pump, at a rate of 2 mL per minute (i.e. 23.5% by weight per hour). 0.82M sulphuric acid is introduced simultaneously in order to maintain the pH at 9 during the addition of the silicate (peristaltic pump regulated at 8 mL/min).

Once the addition is complete, the medium is left to react for 30 minutes at 70° C., with stirring.

The reaction medium is then split into 2 buckets of equal mass. The filler is recovered by centrifugation (Sigma 4K15 bucket centrifuge, 8000 rpm, 10 min, 20° C.).

Next, 4 washing operations are carried out. For each washing operation the filler is dispersed in 200 mL of water, i.e. 100 mL per bucket, and re-centrifuged. In the last washing operation, the supernatant reaches a pH of 7.

Results

The results are presented in Table 2.

TABLE 2

| | Targeted thickness (nm) | Calculated effective thickness* (nm) | Targeted silica content (wt %) | Effective silica content (wt %) | Yield |
|---|---|---|---|---|---|
| 1 | 0.5 | 0.41 | 12.8 | 10.7 | 83.6 |
| 2 | 1.5 | 1.35 | 30.6 | 28.4 | 92.8 |
| 3 | 3 | 2.65 | 46.9 | 43.8 | 93.4 |

*calculated from the effective silica content

Figure 4:
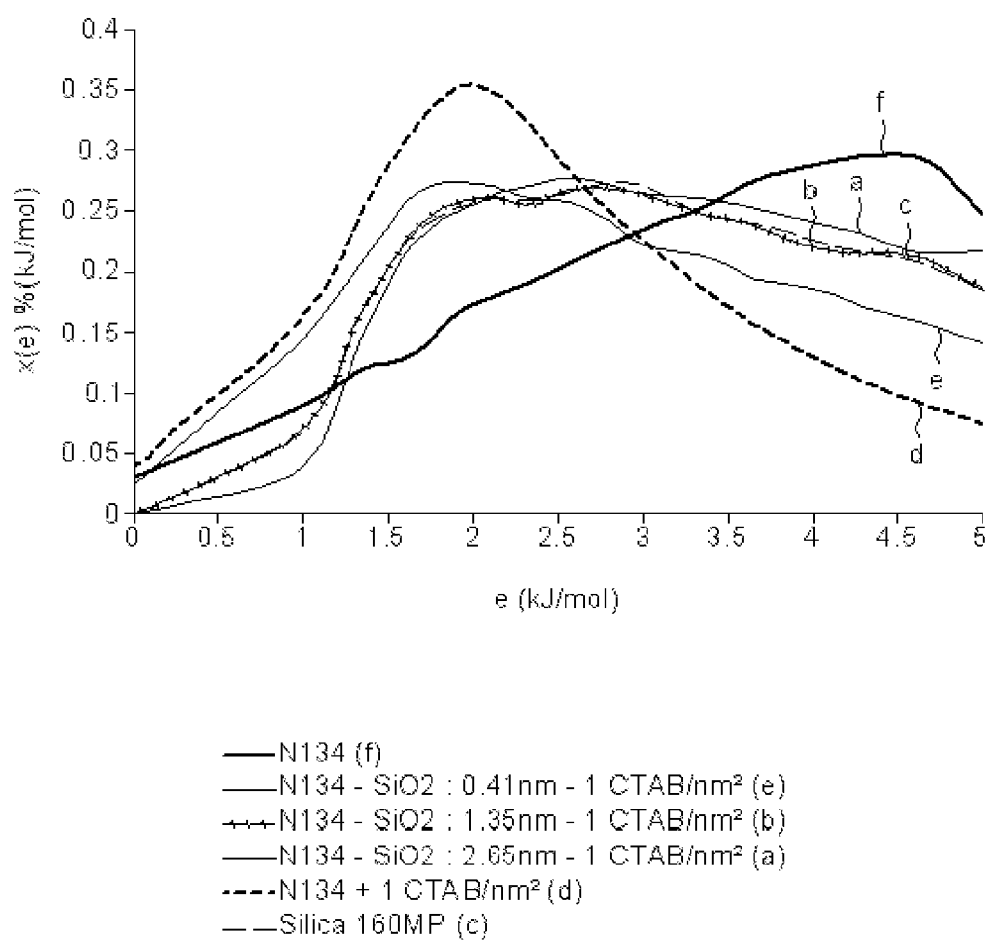
FIGS. 4 and 5 represent site energy distribution curves of silica or of various carbon species that may or may not be covered with silica.

FIG. 4 represents the energy site distribution curves of the various compounds 1, 2 and 3. Also represented is the energy site distribution curve of a N134 carbon black compound covered with 1 molecule of CTAB per $nm^2$ of the substrate, and also that of 160MP silica alone and that of N134 carbon black alone.

FIG. 4 shows that curve (b) of the compound 2 (1.35 nm of silica) and curve (a) of the compound 3 (2.65 nm of silica) are very close to curve (c) of the silica. Good coverage is observed.

Curve (e) of compound 1 (0.41 nm of silica) is intermediate between curve (c) of the silica and curve (d) of the carbon black compound covered with 1 molecule of CTAB per $nm^2$. The surface of the carbon black is therefore probably not completely covered and the CTAB is visible.

Example 3

Various syntheses of silica-covered N134 carbon black are carried out according to the protocol described in Examples 1 and 2.

The experimental data and the results are described in Table 3.

TABLE 3

| Filler no. | function+/ $nm^2$ | Targeted silica content (wt %) | Silica introduced (wt %) | Effective silica content (wt %) | Yield |
|---|---|---|---|---|---|
| 1 | 1 | 5 | 6.25 | 5.08 | 81.3 |
| 2 | 1 | 10 | 12.5 | 9.77 | 78.2 |
| 3 | 1 | 10 | 12.5 | 10.46 | 83.7 |
| 4 | 1 | 10 | 12.5 | 8.78 | 70.2 |
| 5 | 1 | 25 | 27.7 | 25.86 | 93.4 |
| 6 | 1 | 25 | 27.7 | 25.07 | 90.5 |
| 7 | 0.5 | 10 | 12.5 | 10.46 | 83.7 |
| 8 | 0 | 10 | 12.5 | 1.58 | 12.6 |

The yield is defined in the following manner:
yield=effective silica content/targeted silica content Table 3 therefore shows that the yields for the deposition of silica for fillers 1 to 7 are good and therefore that the silica is correctly deposited on the carbon black.

For the filler 8, the yield is very low. This is due to the absence of CTAB during the synthesis. The importance of the presence of CTAB is therefore seen.

Example 4

This example aims to demonstrate the difference in the amount of CTAB on the coverage of the carbon black by the silica.

Various syntheses of silica-covered carbon black (10 g of N134, 10% by weight of silica) are carried out according to the protocol described in Example 1, except that 1M hydrochloric acid is used instead of 0.82M sulphuric acid. In order to prepare the sodium silicate solution, 4.27 g of sodium silicate are diluted in 40.19 mL of water.

The syntheses are carried out for various amounts of CTAB, as indicated in Table 4.

TABLE 4

| | Synthesis | | | | | | |
|---|---|---|---|---|---|---|---|
| | 1 | 2 | 3 | 4 | 5 | 6 | 7 |
| Amount of $CTAB/nm^{2(1)}$ | 1 | 0.5 | 0.2 | 0.1 | 0.05 | 0.01 | 0 |

$^{(1)}$as number of molecules/$nm^2$

A silica content of 10% by weight is targeted.
The results are presented in Table 5.

TABLE 5

| | CTAB/ $nm^2$ | Mass of CTAB for 10 g of N134 | wt % of CTAB | Targeted silica content (wt %) | Effective silica content (wt %) | Yield$^{(1)}$ (%) |
|---|---|---|---|---|---|---|
| 1 | 1 | 0.8476 | 8.48 | 10 | 8.23 | 82 |
| 2 | 0.5 | 0.4238 | 4.24 | 10 | 8.5 | 85 |
| 3 | 0.2 | 0.1695 | 1.70 | 10 | 8.14 | 81 |
| 4 | 0.1 | 0.0848 | 0.85 | 10 | 9.27 | 93 |
| 5 | 0.05 | 0.0424 | 0.42 | 10 | 6.52 | 65 |
| 6 | 0.01 | 0.0085 | 0.08 | 10 | 1.81 | 18 |
| 7 | 0 | 0 | 0 | 10 | 1.4 | 14 |

$^{(1)}$effective silica content/targeted silica content

Figure 5:
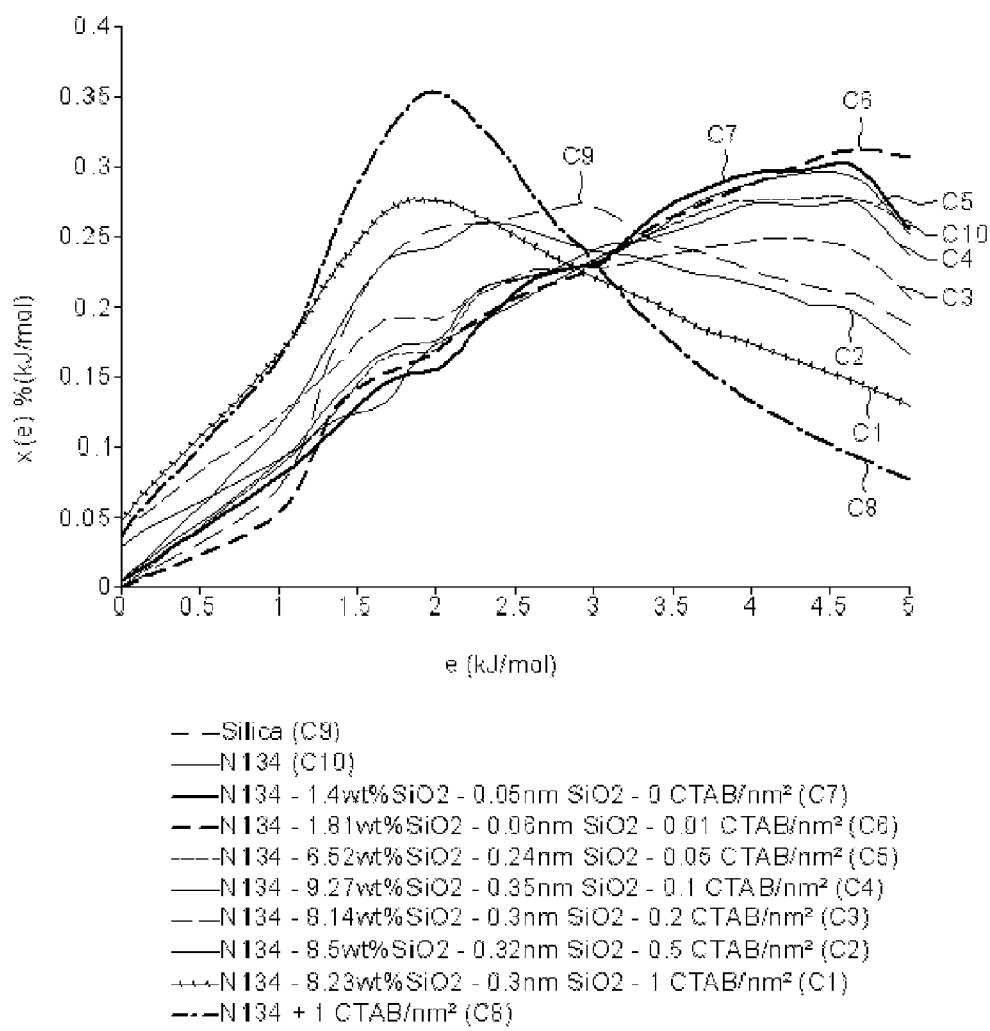

FIG. 5 represents the energy site distribution curves $C_1$ to $C_7$ of the various compounds derived from the syntheses 1 to 7. Also represented is the energy site distribution curve of a N134 carbon black compound covered with 1 molecule of CTAB per $nm^2$ of the substrate (curve $C_8$), and also that of silica alone ($C_9$) and that of N134 carbon black alone ($C_{10}$).

FIG. 5 shows that curve $C_1$ of the compound obtained by synthesis 1 (1 $CTAB/nm^2$) is very close to curve $C_9$ of silica.

Curve 2 of the compound obtained by synthesis 2 (0.5 $CTAB/nm^2$) is close to curve $C_9$ of the silica, but has the appearance of curve $C_8$ of the N134 carbon black compound covered with 1 molecule of CTAB per $nm^2$ of substrate. This indicates that the compound resulting from synthesis 2 corresponds to carbon black partially covered with silica, a portion of the CTAB remaining visible.

The best results in terms of coverage of the carbon black by the silica are therefore obtained for contents of 0.5 and 1 molecule/$nm^2$ of CTAB.

Example 5

The objective of this example is to compare the properties of various rubber compositions comprising, as reinforcing filler, either carbon black alone, or a mixture of carbon black and silica, or silica-covered carbon black obtained by the process according to the invention (compounds A and C).

The formulations of the rubber compositions are given in Table 6. The amounts are expressed in parts per 100 parts by weight of elastomer (phr).

TABLE 6

| | Cmp 1 | Cmp 2 | Cmp 3 | Cmp 4 | Cmp 5 | Cmp 6 | Cmp 7 | Cmp 8 |
|---|---|---|---|---|---|---|---|---|
| GP 21730 | | | | 100 | | | | |
| N134 | 4 | 40 | 0 | 0 | 37.56 | 33.23 | 4 | 50 |
| A | 0 | 0 | 40.4 | 0 | 0 | 0 | 0 | 0 |
| C | 0 | 0 | 0 | 40.6 | 0 | 0 | 0 | 0 |
| Silica (2) | 40 | 0 | 0 | 0 | 3.94 | 8.57 | 51.5 | 0 |
| Liq. silane | 3.2 | 0 | 0.77 | 1.64 | 0.32 | 0.69 | 4.12 | 0 |
| DPG | 0.75 | 0 | 0 | 0 | 0.07 | 0.16 | 0.97 | 0 |
| 6-PPD | | | | 1.5 | | | | |
| Paraffin | | | | 1 | | | | |
| Stearic acid | | | | 2 | | | | |
| ZnO | | | | 3 | | | | |
| S | | | | 1.5 | | | | |
| CBS | | | | 0.9 | | | | |

| | Cmp 9 | Cmp 10 | Cmp 11 | Cmp 12 |
|---|---|---|---|---|
| NR (0) | | | 100 | |
| Carbon black (1) | 0 | 0 | 47.33 | 41.9 |
| A | 50.60 | 0 | 0 | 0 |
| B | 0 | 0 | 0 | 0 |
| C | 0 | 50.9 | 0 | 0 |
| Silica (2) | 0 | 0 | 4.97 | 10.8 |
| Liq. Silane | 0.96 | 2.05 | 0.4 | 0.86 |
| DPG (3) | 0 | 0 | 0.09 | 0.2 |
| 6PPD (4) | | | 1.5 | |
| Paraffin | | | 1 | |
| Stearic acid | | | 2 | |
| ZnO | | | 3 | |
| S | | | 1.5 | |
| CBS (5) | | | 0.9 | |

(0) NR: natural rubber (plasticized, peptized)
(1) N134 carbon black
(2) Silica "Zeosil 1165MP" (Rhodia)
(3) Diphenyl guanidine (vulcanization accelerator)
(4) 6-para-phenylenediamine (antioxidant)
(5) CBS: N-cyclohexyl-2-benzothiazyl sulphenamide ("Santocure CBS" from the company Flexsys)

The synthesis conditions and the characteristics of compounds A and C are given in Table 7.

TABLE 7

|  | C | A |
|---|---|---|
| Synthesis conditions | | |
| Targeted silica content (%) | 18 | 11 |
| Content of CTAB for synthesis | 0.1 | 0.05 |
| Physicochemical characteristics | | |
| Silica content (%) | 20.5 | 9.5 |
| Specific surface area | | |
| BET ($m^2/g$) | 151.4 | 154.6 |

The properties are given in Tables 8 and 9.

TABLE 8

|  | 1<br>1165MP-<br>40[1] | 2<br>N134-<br>40[1] | 3<br>A-9%[2]<br>CTAB<br>0.05[3]-<br>40[1] | 4<br>C-20%[2]<br>CTAB<br>0.1[3]-<br>40[1] | 5<br>N134-<br>1165MP<br>(9%[4])-<br>40[1] | 6<br>N134-<br>1165MP<br>(20%[4])-<br>40[1] |
|---|---|---|---|---|---|---|
| MSA300/MSA100 | 1.72 | 2.07 | 2.09 | 2.02 | 2.08 | 2.08 |
| $\tan\delta_{max}$ return | 0.148 | 0.193 | 0.171 | 0.137 | 0.185 | 0.162 |

TABLE 9

|  | 7<br>1165MP-<br>50[1] | 8<br>N134-<br>50[1] | 9<br>A-9%[2]<br>CTAB<br>0.05[3]-<br>50[1] | 10<br>C-20%[2]<br>CTAB<br>0.1[3]-<br>50[1] | 11<br>N134-<br>1165MP<br>(9%[4])-<br>50[1] | 12<br>N134-<br>1165MP<br>(20%[4])-<br>50[1] |
|---|---|---|---|---|---|---|
| MSA300/MSA100 | 1.79 | 2.12 | 2.13 | 2.14 | 2.23 | 2.11 |
| $\tan\delta_{max}$ return | 0.203 | 0.251 | 0.218 | 0.196 | 0.238 | 0.223 |

[1] content of filler (silica and/or carbon black, or compound A or C depending on the case)
[2] content of silica by weight in compound A or C
[3] content of CTAB
[4] content of silica by weight in the silica + carbon black mixture The quantities indicated in Table 8, the meaning of which is given below, are indicated in Table 8 to facilitate the reading thereof. The more accurate values of those from Tables 6 and 7.

The decrease in the $\tan\delta_{max}$ return value results in a decrease in the hysteresis of the corresponding composition, therefore a decrease in the rolling resistance of tires which use such a composition.

It is thus observed that the hysteresis of composition 3 is better than that of composition 5 which is better than that of composition 2.

Likewise, respectively, for the compositions 8, 9 and 11.

It can therefore be concluded therefrom that the hysteresis of a composition comprising a silica-covered carbon black obtained by the process according to an embodiment of the invention is better than that of a composition containing a carbon black+silica mixture, which is better than that of a composition containing carbon black alone.

In the same way, the comparison of compositions 2, 3 and 5; 8, 9 and 11; 2, 4 and 6; 8, 10 and 12 shows that the reinforcing properties, after curing, of a composition comprising a silica-covered carbon black obtained by the process according to an embodiment of the invention, of a composition containing a carbon black+silica mixture, and of a composition containing carbon black alone are equivalent.

Thus, it can be concluded that the process according to the invention makes it possible to obtain compositions comprising a silica-covered carbon black which have a good reinforcement-hysteresis compromise: these compositions resulting in a reinforcement that is equivalent to that of a composition containing carbon black alone, whilst the hysteresis is better than that of a composition containing carbon black alone, and better than that of a composition containing a mixture of carbon black and silica.

The invention claimed is:

1. A process for preparing a carbon species partially or completely covered with silica, comprising:
   bringing the carbon species into contact, in an aqueous medium, with one or more cationic surfactants, the one or more cationic surfactants activating the carbon species and positively charging the carbon species, thereby controlling the amount of silica deposited,
   the cationic surfactant(s) is (are) selected from the group consisting of cetyltrimethylammonium bromide, hexadecylamine, sodium 1-pentane-sulphonate monohydrate, ethonium, decamethoxine, tetradecyltrimethylammonium bromide, decyltrimethylammonium bromide, dodecyltrimethylammonium bromide, cetyltrimethylammonium chloride, tetramethylammonium hydroxide, dodecylpyridinium bromide, and cetylpyridinium chloride,
   the amount of cationic surfactant added is such that the cationic charge density of the BET specific surface area of the carbon species varies from 0.05 to 2 cationic charges per nm² of the carbon species, adjusting the pH of the reaction medium of the suspension using an alkaline agent to a pH that varies from 8 to 10, the amount of alkali metal silicate added is a function of the theoretical thickness $e_{theo}$ of silica deposited on the carbon species, which corresponds to the formula:

$$\frac{T}{1-T} = e_{theo} \times SS \times \rho_{SiO_2} \Leftrightarrow e_{theo} = \frac{T}{(1-T) \times SS \times \rho_{SiO_2}}$$

in which

T represents the silica content by mass $T=m_{SiO2}/(m_{SiO2}+m_c)$, where $m_{SiO2}$ is the mass of silica and $m_c$ is the mass of carbon, $e_{theo}$=theoretical thickness in nm, and SS=specific surface area in nm²/g of the silica=$2.1\times10^{21}$ g/nm³, and adding one or more alkali metal silicates to the reaction medium obtained, while maintaining the pH of the reaction medium between 8 and 10.

2. The process according to claim 1, wherein the bringing of the carbon species and the cationic surfactant(s) into contact occurs while heating at a temperature between 70° C. and 90° C.

3. The process according to claim 1, wherein the adjusting of the pH of the reaction medium after the carbon species and the cationic surfactant(s) have been brought into contact comprises adjusting to a pH that varies from 8.5 to 9.5.

4. The process according to claim 1, wherein the carbon species is selected from the group consisting of carbon blacks, natural and synthetic graphites, carbon fibres, graphenes, fullerenes, acetylene blacks, and carbon nanotubes.

5. The process according to claim 1, wherein the cationic surfactant(s) is (are) cetyltrimethylammonium bromide.

6. The process according to claim 1, wherein the cationic surfactant(s) is (are) present in an amount that varies from 0.1 to 1.5 molecules per nm² of the carbon species.

7. The process according to claim 1, wherein the reaction with the alkali metal silicate is carried out while heating at a temperature between 70° C. and 90° C.

8. The process according to claim 1, wherein the alkali metal silicate(s) is (are) sodium silicates.

9. The process according to claim 1, wherein the cationic surfactant(s) is (are) present in an amount that varies from 0.5 to 1.5 molecules per nm² of the carbon species.

* * * * *